(12) United States Patent
Stefan et al.

(10) Patent No.: US 10,597,029 B2
(45) Date of Patent: Mar. 24, 2020

(54) DYNAMIC PARKING USING AN ASSISTANCE SYSTEM

(71) Applicant: Ford Global Technologies, LLC, Dearborn, MI (US)

(72) Inventors: Frederic Stefan, Aachen (DE); Christoph Arndt, Moerlen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/977,584

(22) Filed: May 11, 2018

(65) Prior Publication Data

US 2018/0334164 A1    Nov. 22, 2018

(30) Foreign Application Priority Data

May 18, 2017  (DE) .................. 10 2017 208 383

(51) Int. Cl.

| | |
|---|---|
| *B60W 30/06* | (2006.01) |
| *G08G 1/16* | (2006.01) |
| *G06K 9/00* | (2006.01) |
| *G08G 1/14* | (2006.01) |
| *B62D 15/02* | (2006.01) |

(52) U.S. Cl.
CPC ......... *B60W 30/06* (2013.01); *B62D 15/0285* (2013.01); *G06K 9/00812* (2013.01); *G06K 9/00825* (2013.01); *G08G 1/143* (2013.01); *G08G 1/147* (2013.01); *G08G 1/168* (2013.01); *B60W 2550/308* (2013.01); *B60W 2710/207* (2013.01)

(58) Field of Classification Search
CPC .......... B60W 30/06; B60W 2710/207; B60W 2550/308; G05D 1/021; G08G 1/147; G08G 1/143; G08G 1/168; G06K 9/00825; G06K 9/00812
See application file for complete search history.

(56) References Cited

U.S. PATENT DOCUMENTS

| | | | |
|---|---|---|---|
| 9,165,464 B2 | 10/2015 | Faber | |
| 2011/0082613 A1* | 4/2011 | Oetiker ............. | B60W 10/20 701/25 |

FOREIGN PATENT DOCUMENTS

| | | |
|---|---|---|
| DE | 102007009745 A1 | 4/2009 |
| DE | 102007049709 A1 | 4/2009 |
| DE | 102011109712 A1 | 2/2013 |
| EP | 2081167 * | 7/2009 |
| WO | 2012041670 A1 | 4/2012 |
| WO | 2012069247 A1 | 5/2012 |

OTHER PUBLICATIONS

Machine Translation EP 2081167; Jul. 2009.*

* cited by examiner

*Primary Examiner* — Anne M Antonucci
(74) *Attorney, Agent, or Firm* — Frank Lollo; Brooks Kushman, P.C.

(57) ABSTRACT

A method to park a vehicle in a parking space using a parking assistant is provided. The course of a parking maneuver is dynamically adapted to boundaries of the parking space that are changed during the parking maneuver by determining whether and in which direction the boundaries of the parking space change during the parking maneuver. An originally determined first trajectory is replaced by a second trajectory that is adapted to changed boundaries of the parking space and along which the parking maneuver is continued.

20 Claims, 2 Drawing Sheets

DYNAMIC PARKING USING AN ASSISTANCE SYSTEM

CROSS-REFERENCE TO RELATED APPLICATIONS

This application claims foreign priority benefits under 35 U.S.C. § 119(a)-(d) to DE Application 10 2017 208 383.2 filed May 18, 2017, which is hereby incorporated by reference in its entirety.

TECHNICAL FIELD

The disclosure concerns a method for parking a vehicle in a parking space with a parking assistant, wherein a parking maneuver is dynamically adapted to boundaries of a parking space that are changed during the maneuver.

BACKGROUND

In modern motor vehicles, systems for assisting a parking process, in brief parking assistance systems, are often used. Conventionally, in this case, surroundings of a vehicle are checked for the presence of a suitable parking space by sensor-based measurement while passing a parking space, and the vehicle is parked in a selected parking space using the parking assistance system according to a decision by the driver. There are parking assistance systems that can carry out the entire parking process automatically. With autonomously driven vehicles, automatic parking assistance systems are also occurring more frequently.

Typically, in an observation phase, a parking assistance system of a vehicle determines a suitable parking space in which the vehicle fits with the dimensions thereof, wherein adjacent regions are included within a determination that are sufficient for boarding and exiting and loading, and that guarantee a safety distance from other vehicles. If a suitable parking space is found, in a calculation phase, a trajectory is calculated in which a steering angle and vehicle speeds within defined sub segments of the path to be traversed are incorporated. Depending on the prevailing dimensions of the vehicle and the parking space, the trajectory can be divided into sub segments in which the vehicle may move back and forth multiple times. Furthermore, correction movements can be incorporated into the trajectory. In a parking phase, the parking assistance system starts a movement of the vehicle that is controlled according to the calculated trajectory into the parking space. Conventional parking assistance systems operate during this phase according to the open-loop principle (open control loop), with which, once calculated, the trajectory is not changed when movement of the vehicle has been started. If a vehicle bounding the parking space moves during the parking process, the parking process cannot be dynamically adjusted to the changed parking space. The object of the present disclosure is to improve conventional methods based on the use of parking assistance systems.

SUMMARY

A first aspect of the disclosure concerns a method for parking using a parking assistance system of a first vehicle in a parking space bounded by at least one second vehicle, wherein, using the system, a measurement of a potential parking space is carried out by the first motor vehicle while driving past a parking space that is favorable for a parking process. A first trajectory for a parking process into the parking space starts from a favorable starting position for parking, and an assisted parking process into the parking space by the first vehicle is started. The method according to the disclosure is particularly characterized by the fact that it is determined during assisted parking process whether the boundary on the parking space formed by the second vehicle changes during the parking process.

The method according to the disclosure is advantageous since compared to conventional methods with which a parking assistance system is used, boundaries on a parking space formed by other vehicles are observed during a parking process. During the parking process, the system advantageously responds dynamically to changes caused by a movement of parked vehicles, in particular widening of the parking space. In this case, the method is in particular designed to use changes of the parking space advantageously for optimization of the parking process. Parking assistance systems are in particular automatic parking assistance systems here.

In this case, the method is not limited to detection of a change in one direction, but is designed for detection of changes in both directions of a parking space boundary if the parking space is bounded by two vehicles. If the parking space is only bounded by one vehicle, and on a corresponding other side by a natural obstacle, such as for example a curb at the end of a parking space, only one bounding vehicle is detected.

It is preferably detected during a parking maneuver whether the boundary on the parking space in a certain direction has extended. Preferably, in this case a first trajectory is ignored if it has been detected that the boundary on the parking space in a certain direction has extended.

Particularly, preferably, a current movement of the vehicle during a parking maneuver is ended as planned and the parking maneuver is stopped if a change in the parking space boundary has been detected during the current movement. Likewise, a current movement of the vehicle during a parking maneuver is particularly, preferably stopped if at the end of the current movement a change of the parking space boundary has been detected. At the end means here that the current movement has actually finished or is within approximately the last 10% of the current movement.

A current movement of the vehicle means here that the vehicle is moving on the originally envisaged first trajectory during the parking process, wherein, during moving on the first trajectory, individual movements that are each limited by stop events are carried out, for example to drive backwards and forwards to reach an ideal parking position. The first trajectory is therefore divided into sections that are each traversed in separate movements. The term "current movement" relates here to said individual movements.

In the method according to the disclosure, after stopping said movement, a second trajectory is preferably determined by the system, with which the parking maneuver is continued according to the changed parking space boundary instead of according to the first trajectory. Preferably during this, in the case of widening the parking space, an originally provided parking position is displaced in a direction of the widening. In other words, the originally determined first trajectory is ignored and a newly determined second trajectory is used to complete the parking maneuver by steering the first vehicle in the direction of the parking space widened by movement of the second vehicle. During this, the first vehicle is preferably moved so far in the direction until a boundary of the parking space, for example a further vehicle, limits the movement.

During the determination of the second trajectory, preferably a steering angle, a distance from the parking position to be newly taken up and a speed to be traveled at during this are incorporated into the determination of the second trajectory.

The described method according to the disclosure is thus advantageous because complex maneuvering is unnecessary as a result of using changes of parking space dimensions arising during a parking maneuver, and, as a result, time and fuel can be saved. Furthermore, the available parking space can be used economically as no parking space is wasted that arises from the change of the originally available parking space as a result of occupying space that is just coming free. The method is suitable both for parallel and perpendicular or other types of parking. The method is suitable both for partially and fully assisted parking and for fully automatic remote-control parking.

A second aspect of the disclosure concerns a system for carrying out a method according to the disclosure for assisted parking of a first vehicle comprising a parking assistance system with at least one sensor and a control device to determine a presence of a parking space, and to calculate trajectories and control vehicle movements according to calculated trajectories. The control device is embodied to detect at least one parking space boundary corresponding to values transmitted by the sensor, to determine a first trajectory for a parking maneuver by the first vehicle, to issue corresponding control commands to devices of the vehicle, to start a parking maneuver corresponding to the first trajectory and to detect obstacles and boundaries of a parking space arising according to values transmitted by the sensor. The system is characterized in particular in that the control device is further embodied to monitor boundaries of the parking space formed by at least one second vehicle using signals transmitted by the sensor, and in the event of changes of the boundaries during the parking maneuver to issue control commands that lead to ending a current movement within the first trajectory, and the first vehicle is steered in a direction of a second trajectory newly calculated by the control device in a direction of a changed boundary of the parking space.

The advantages of the system according to the disclosure correspond to the advantages of the method according to the disclosure.

A third aspect of the disclosure concerns a vehicle with a system according to the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
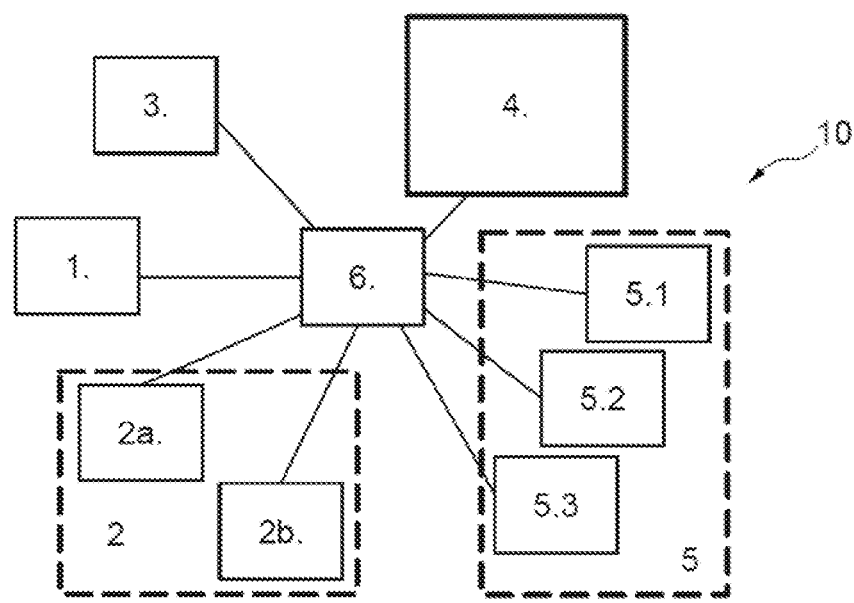
FIG. 1 shows a block diagram of an embodiment of the system according to the disclosure.

In FIG. 1 an embodiment of a system according to the disclosure 10 is represented in modular form, i.e. comprising modules. The system 10 is disposed in a first vehicle. In this case, the modules do not necessarily correspond to spatial units, but can be considered to be functional units that operate within a control device that is suitably embodied to control a method according to the disclosure. Using the modules, an example of a method is implemented, the steps of which can be seen in FIG. 2 and are described below.

A first module 1 comprises sensors of a parking assistant of the first vehicle. The sensors are embodied to detect obstacles in the near surroundings of the vehicle. The sensors are for example ultrasonic sensors, or are based on radar, cameras, laser, lidar, vehicle-to-vehicle communications or other technologies.

A second module 2 concerns detection of parking space boundaries and is provided to a carry out a monitoring method in relation to the boundaries of a parking space. In this case, the second module 2 comprises two sub modules: a first sub module 2a determines parking space boundaries in the case of a sufficiently large parking space that has been determined in a first step S1 as suitable for parking the first vehicle. The first sub module 2a detects in a step S2a whether and at what points in the parking space there are boundaries and other obstacles or not. The information about this is placed in a memory unit. A second sub module 2b is active during an automatic parking maneuver, wherein the second sub module 2b detects whether boundaries that are to be expected according to the stored information are present, or whether boundaries have disappeared in the meantime. In this case, an algorithm with the following steps can be used in a corresponding method:

S2b0: The parking assistant calculates a first trajectory on the basis of determined dimensions of the parking space and starts a movement oriented to the first trajectory in a defined direction, for example forwards or backwards for parking in the determined parking space.

S2b1: of the parking assistant determines using the sensors whether obstacles arise in any direction about the vehicle, in particular boundaries of the parking space.

S2b2: if no obstacles arise after a defined distance traversed or a defined time that should have arisen according to information stored by the first sub module 2a, the parking assistant determines that boundaries of the parking space have been modified. In this case, the algorithm ends and the method continues to step S3, otherwise it continues with step S2b3.

S2b3: if an obstacle in a form of a parking space boundary is determined, the parking assistant checks that the obstacle remains present, wherein a distance from the obstacle is reduced in proportion to a speed of the first vehicle. If the obstacle remains present until an end of the movement, the algorithm for a next movement of the parking maneuver starts again at S2b0. Otherwise, if a position of the obstacle changes during the movement of the first vehicle, which for example is determined by the distance from the obstacle increasing, remaining the same or reducing out of proportion to the speed of the first vehicle, the algorithm stops and the method is moved on to step S3.

A third module 3 concerns a determination of changes of the parking space dimensions that according to the disclosure relate in particular to an increase of the parking space dimensions. If the second module 2 has determined a change in the boundaries in step S2b2 or S2b3, this information is passed to the third module 3. In this case, in a step S3, the third module determines a direction in which the parking space dimensions have increased in relation to the movement of the first vehicle.

A fourth module 4 concerns optimization of a current parking maneuver. If the third module 3 has determined widening of the parking space, a control command is sent to the parking assistant by the fourth module 4 in a step S4.1 that leads to a current movement being completed, and an originally planned maneuver should be terminated. In a step S4.2, a command is sent by the fourth module 4 to the parking assistant in module 5 to calculate a new (second) trajectory that corresponds to a modified parking space boundary, which replaces the first trajectory, and along which the parking maneuver is to be continued from a position reached after step S4.1 in the direction of the widening of the parking space.

A fifth module 5 comprises a fully automated parking assistance system. The parking assistance system comprises a conventional, fully automated parking assistance system 5.1 that is made up of at least one sensing module for the sensor-based observation of surroundings, a trajectory calculation module and a module to control a vehicle movement. The parking assistance system comprises a signal and memory module 5.2 that is embodied to determine parking space boundaries on the basis of data determined by the sensing module, and a special trajectory calculation module 5.3 that is embodied to carry out the following method: in a step S5.3a, a position originally envisaged for a first vehicle is shifted by a length (in the case of parallel parking) of the first vehicle in a direction of a widening of a parking space determined in step S3 to define a new position. During this, a safety distance that is conventionally to be maintained between parked vehicles is also calculated, for example an edge region of about 30-100 cm. In a step S5.3b, the module 5.3 calculates a new trajectory with steering angles and speeds that is to be traveled by the first vehicle to reach a new parking position. In a step S5.3c, the module 5.3 instructs the parking assistance system to ignore the originally calculated (first) trajectory and to complete the parking maneuver according to the new (second) trajectory.

A sixth module 6 comprises a central control unit that coordinates the system 10 and ensures communications between all modules.

Figure 3A:
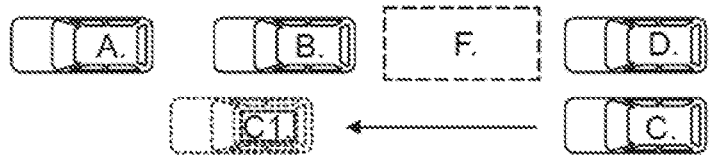
FIG. 3A shows a schematic representation of a situation of a parking space maneuver.
Figure 3B:
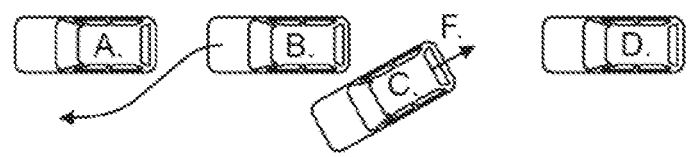
FIG. 3B shows a schematic representation of a further situation of a parking space maneuver.
Figure 3C:
FIG. 3C shows a schematic representation of a further situation of a parking space maneuver.
Figure 2:
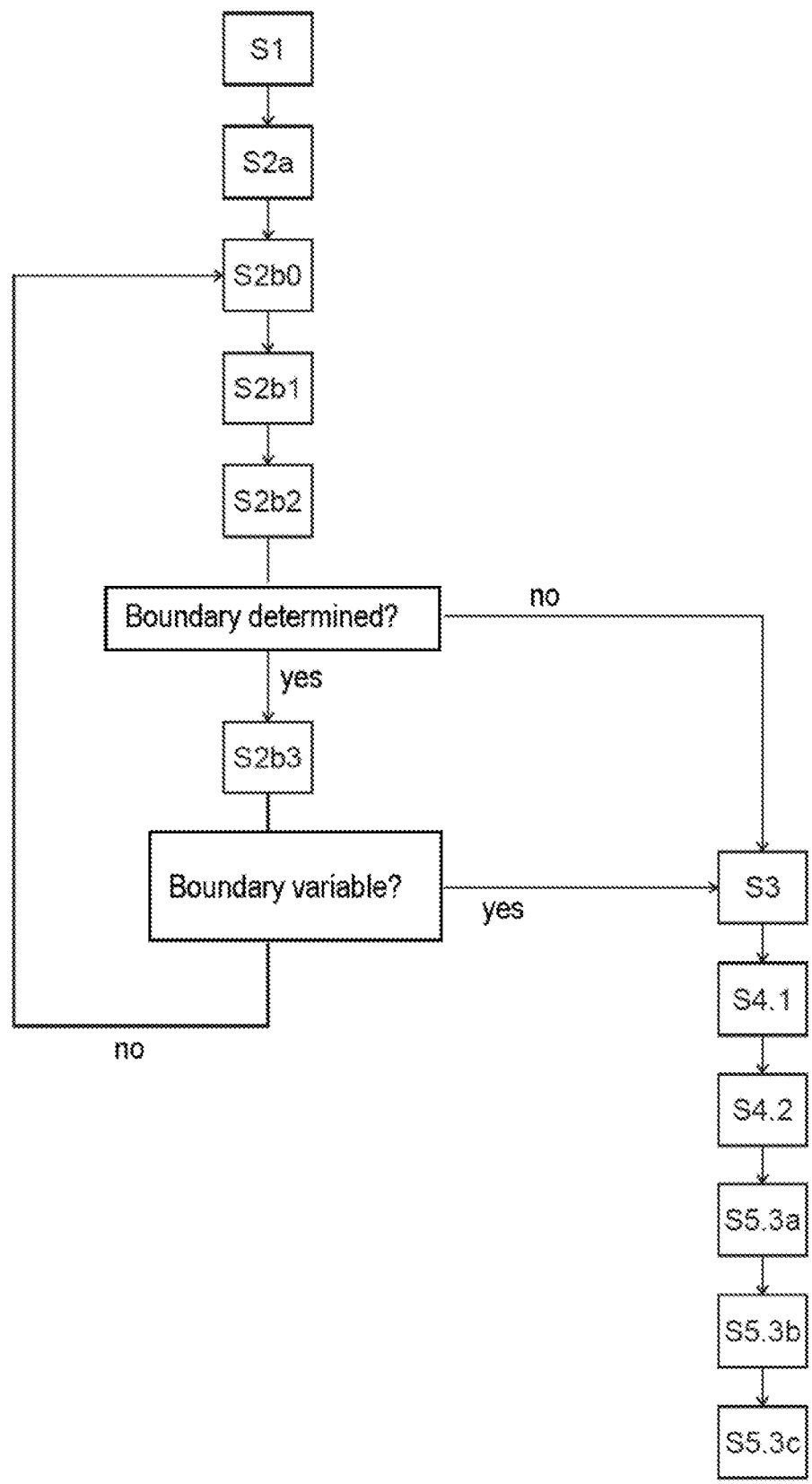
FIG. 2 shows a flow chart of an embodiment of the method according to the disclosure.

The method described using FIG. 2 can be illustrated using FIGS. 3A-3C. In FIG. 3A, a first vehicle C can be seen that is seeking a suitable parking space when searching for a parking position. In step S1, a parking assistant of the vehicle C detects a suitable parking space F that is bounded by vehicles B and D. In this case, a lateral boundary E of the parking space F caused by for example a curb is also detected. The first vehicle C stops in a position C1. A parking maneuver to parallel park the vehicle C in the parking space F is started. During this, the algorithm of the steps S2b0-S2b3 is carried out (FIG. 3B).

During the parking maneuver, the vehicle B moves by unparking, i.e. it exits the parking position thereof (FIG. 3B). In this case, in step S2b3 module 2b detects that a distance between the vehicle C and the vehicle B that was bounding the parking space is increasing. In step S3, module 3 determines that the parking space F has extended in a direction of a front of the first vehicle C after the vehicle B has exited a position occupied thereby until now. In other words, new boundaries are determined within a range of the sensor in a driving direction by the parking assistant.

In step S4.1, the current (reversing) movement of the vehicle C is completed and the parking maneuver is temporarily stopped. In step S4.2, the parking assistance system 5 is instructed to determine a new (second) trajectory, along which the first vehicle C is to be steered into a parking position behind the vehicle A. In the steps S5.3a-S5.3c, a second trajectory is determined, and the first vehicle C is steered along the second trajectory into the new position (FIG. 3C).

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for parking using a parking assistance system, comprising:
   measuring a potential parking space using the system while a first vehicle is driving by a parking space for a parking process;
   starting a first trajectory for a parking process into the parking space from a position that is favorable for parking, and an assisted parking process of the first vehicle into the parking space; and
   detecting whether a boundary of the parking space formed by a second vehicle changes during the parking process; and
   calculating a threshold distance from the second vehicle to update the parking space in response to detecting that a boundary of the parking space formed by the second vehicle has changed during the parking process.

2. The method as claimed in claim 1 further comprising detecting whether the boundary of the parking space has extended in a certain direction.

3. The method as claimed in claim 2 further comprising ignoring the first trajectory if a detected boundary of the parking space has extended in a certain direction.

4. The method as claimed in claim 1 further comprising ending a current movement of the first vehicle during the parking process and stopping the parking process if a change of the boundary is detected during the current movement.

5. The method as claimed in claim 4 further comprising stopping a current movement of the vehicle during the parking process if a change of the boundary is detected at an end of the current movement.

6. The method as claimed in claim 4 further comprising determining, after stopping the current movement, a second trajectory via the system, wherein the parking process is continued according to the second trajectory indicative of a changed parking space boundary instead of according to the first trajectory.

7. The method as claimed in claim 6 further comprising incorporating a steering angle, a distance from a new parking position to be adopted and a speed at which to travel in the second trajectory.

8. The method as claimed in claim 1 further comprising shifting a parking position based on widening the parking space in a direction of the widening.

9. A parking assist system comprising:
a sensor; and
a control device configured to, in response to extension of a parking space boundary in a certain direction and presence of an obstacle detected via the sensor during a started first trajectory of a parking maneuver for a first vehicle, stop the first trajectory and steer the first vehicle along a second trajectory in a direction of the boundary defined by a moving second vehicle, wherein the second trajectory includes accommodating for a threshold distance from the second vehicle.

10. The parking assist system as claimed in claim 9, wherein the control device is configured to, in response to the extension of the detected parking space during a current movement on the first trajectory, end the current movement to stop the parking maneuver.

11. The parking assist system as claimed in claim 9, wherein the control device is configured to, in response to the extension of the detected parking space at an end of a current movement on the first trajectory, stop the current movement to stop the parking maneuver.

12. The parking assist system as claimed in claim 9, wherein the control device is configured to, in response to a widening of the detected parking space from the second vehicle, shift a parking position in a direction of the widening.

13. The parking assist system as claimed in claim 9, wherein the second trajectory includes a steering angle, a distance from a new parking position and a vehicle speed.

14. The parking assist system as claimed in claim 9, wherein the control device is configured to, in response to the extension of the detected parking space, ignore the first trajectory.

15. A vehicle comprising:
a parking assist system having at least one sensor; and
a control device configured to, in response to extension of a parking space boundary, defined by a second vehicle, detected via the sensor while the vehicle is following a first trajectory of a parking maneuver, stop the first trajectory and steer the vehicle along a second trajectory in a direction of the boundary, wherein the second trajectory includes accommodating for a threshold distance from the second vehicle.

16. The vehicle as claimed in claim 15, wherein the control device is configured to, in response to the extension of the detected parking space during a current movement on the first trajectory, end the current movement to stop the parking maneuver.

17. The vehicle as claimed in claim 15, wherein the control device is configured to, in response to the extension of the detected parking space at an end of a current movement on the first trajectory, stop the current movement to stop the parking maneuver.

18. The vehicle as claimed in claim 15, wherein the control device is configured to, in response to a widening of the detected parking space from the second vehicle, shift a parking position in a direction of the widening.

19. The vehicle as claimed in claim 15, wherein the second trajectory includes a steering angle, a distance from a new parking position and a vehicle speed.

20. The vehicle as claimed in claim 15, wherein the control device is configured to, in response to the extension of the detected parking space, ignore the first trajectory.

* * * * *